A. J. KIECKHEFER.
DINNER PAIL.
APPLICATION FILED MAY 12, 1909.
945,724.
Patented Jan. 4, 1910.
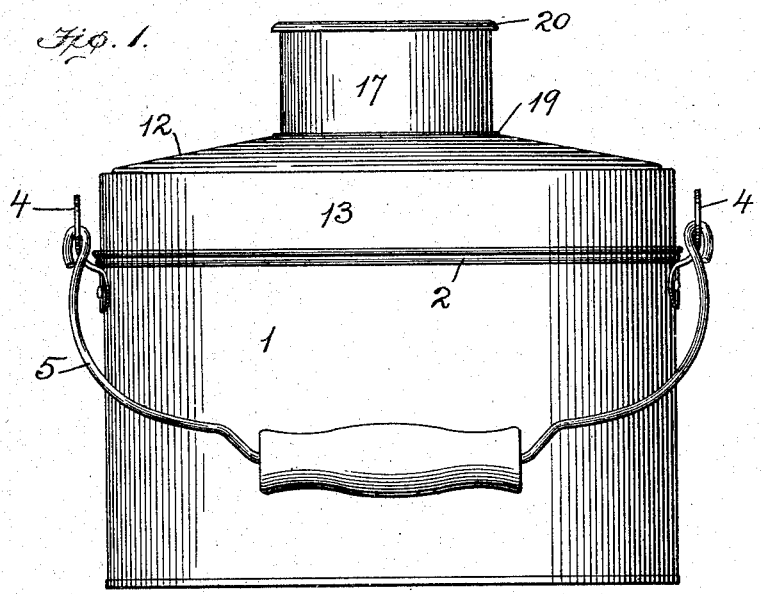
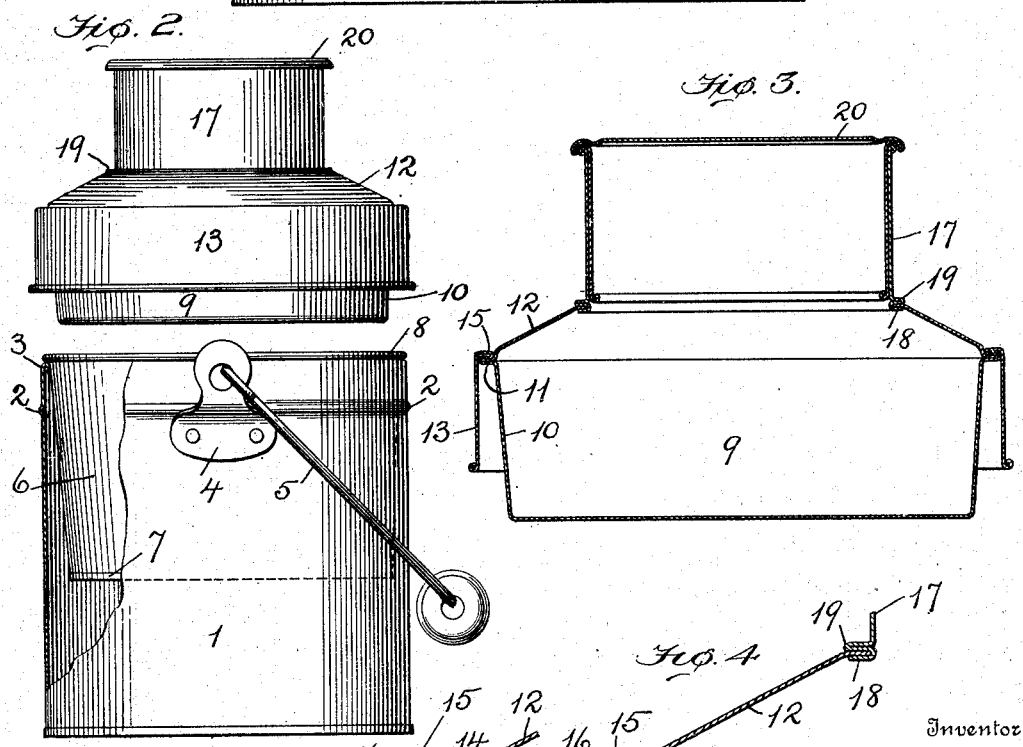
Witnesses
Edwin L Bradford
G. Ferdinand Vogt
Inventor
Alfred J. Kieckhefer
By Mann & Co.
Attorneys

UNITED STATES PATENT OFFICE.

ALFRED J. KIECKHEFER, OF MILWAUKEE, WISCONSIN, ASSIGNOR TO NATIONAL ENAMELING AND STAMPING COMPANY, A CORPORATION OF NEW JERSEY.

DINNER-PAIL.

945,724.  Specification of Letters Patent.  Patented Jan. 4, 1910.

Application filed May 12, 1909. Serial No. 495,459.

*To all whom it may concern:*

Be it known that I, ALFRED J. KIECK-HEFER, a citizen of the United States, residing at Milwaukee, in the county of Milwaukee and State of Wisconsin, have invented certain new and useful Improvements in Dinner-Pails, of which the following is a specification.

This invention relates to improvements in buckets or pails and has particular reference to pails of that class known as dinner pails.

An object of the invention is to provide a dinner pail of improved construction whose cover will carry an exterior flange surrounding the pail and a pendent receptacle which parts will straddle the upper edge of the wall of the pail and make a better sealing contact between the pail and cover.

With this and other objects in view, the accompanying drawing illustrates the invention wherein,—

Figure 1, is a side elevation of a pail constructed in accordance with the invention. Fig. 2, an end elevation thereof,— the cover receptacle being slightly elevated from the body and a portion of the wall of the latter having been broken away to show the telescoping pan therein. Fig. 3 is a vertical cross-section on a horizontal scale through the cover receptacle. Fig. 4, an enlarged sectional detail of the wall of the latter to show the joints of the parts thereof, and Fig. 5, an enlarged sectional detail of the joint or seam that unites the depending flange to the cover receptacle.

Referring to the several views in the drawing the numeral, 1, designates the body or lower receptacle of the pail which may be of any desired construction or shape and which is provided with an exteriorly projecting bead or shoulder, 2, adjacent but spaced below its upper edge, 3. This exterior bead will support the cover. The said upper edge of the body may be slightly rolled inward or otherwise formed with a view of reinforcing it and at opposite ends or sides the body is provided with suitable bail-ears, 4, a bail, 5, and a handle is attached for convenience in carrying the pail. These bail-ears are attached to the body at a point just below the exterior bead or shoulder, 2, and bend outwardly slightly so as to clear the vertical wall between the bead and the upper edge, as clearly shown in Fig. 1.

If desired, the pail may be provided with a pan or receptacle, 6, which is preferably tapered,—being slightly smaller across the bottom, 7, than at the top so as to readily nest or telescope within the body. The upper edge of this pan, 6, is provided with a curl or bead, 8, which rests upon the upper edge, 3, of the body so that the pan will be suspended therefrom.

The combined cover and upper receptacle has a peculiar formation in that it comprises a shallow receptacle, 9, having a bottom and integrally-formed upwardly-projecting walls, 10. These walls preferably flare or incline outwardly as they project from the flat bottom and are provided with an outwardly-extending horizontal flange portion, 11, at their upper ends. The cover proper comprises a sloping or inclined breast or top, 12, and a downward depending flange, 13, which is integral with said breast and exteriorly surrounds the walls, 10, of the said receptacle, 9, but is separated or spaced apart therefrom. My construction provides for the formation of a double fold in the metal of the flange and breast and connecting the upper edge of the receptacle, 9, with the said double fold, as will now be described.

The lowermost part of the breast, 12, is formed into a horizontal ledge, 14, as seen in Fig. 5, and the uppermost part of the vertical depending flange, 13, is formed into a single fold, 15, see Fig. 5, which is also integral with said horizontal ledge, 14. The upper edge, 16, of the receptacle, 9, fits into the single fold, 15, on the said depending flange, 13, and then this single fold is turned down on the said horizontal ledge, 14, and thereby forms a double fold inclosing a hooked edge on the receptacle, 9.

It will thus be seen that in the finished article the flange, 11, of the pan; the ledge, 14, of the breast; the fold, 15, and edge, 16, of the pan all lie in a horizontal plane,—one above the other while the flange, 13, depends and hangs vertically therefrom. By reference to Fig. 5 it will be seen how the edge, 16, of the pan is first inserted in the fold, 15, while both are in a vertical position at the side of the ledge, 14, and it will also be seen by reference to Fig. 4, how those parts are folded or turned down on the ledge, 14, to lock them together.

The breast, 12, is provided with a central circular opening about which a cylindrical nozzle or socket member, 17, is secured and by reference to Fig. 4 it will be seen that the lower end of this cylindrical member is provided with a bottom flange, 18, which projects beneath the breast while an outwardly-projecting bead or fold, 19, is formed in the wall of the cylinder on top of the breast whereby to clamp the edge of the breast around said opening and thereby lock the cylindrical nozzle thereto.

A suitable cup, 20, fits down into the cylindrical nozzle, 17, and closes the same and when removed may be reversed or inverted and used as a drinking utensil.

From the foregoing description it will be seen that when the combined cover, 12, depending flange, 13, and upper receptacle, 9, are fitted on the pail body, 1, the said upper receptacle, 9, will project down and closely fit inside of the upper part of the pan, 6, while the straight depending flange, 13, of the cover will exteriorly surround the outside of the upper part of the body, and the lower edge of said depending flange will seat on the exterior bead, 2, on the pail-body; these several contacting parts will make a dust-proof joint between the cover parts and body, 1.

Having thus described my invention what I claim and desire to secure by Letters Patent is,—

In a dinner pail the combination with the pail-body, of a cover portion having a breast and a depending flange integral with the breast and exteriorly surrounding the said pail-body and the metal of the flange and breast forming a double-fold, and a receptacle having a hooked rim-edge inclosed in the said double-fold and therefrom depending inside of the body.

In testimony whereof I affix my signature in presence of two witnesses.

ALFRED J. KIECKHEFER.

Witnesses:
   EMIL H. WINTER,
   G. A. POHL.